United States Patent
Sturrus et al.

(10) Patent No.: US 6,510,771 B2
(45) Date of Patent: Jan. 28, 2003

(54) DIE APPARATUS FOR CUTTING END OF BUMPER BAR

(75) Inventors: Peter Sturrus, Grand Haven, MI (US); Richard D. Heinz, Grand Haven, MI (US); Kirk W. Briggs, Kent City, MI (US)

(73) Assignee: Shape Corporation, Grand Haven, MI (US)

( * ) Notice: Subject to any disclaimer, the term of this patent is extended or adjusted under 35 U.S.C. 154(b) by 0 days.

(21) Appl. No.: 09/784,257

(22) Filed: Feb. 15, 2001

(65) Prior Publication Data

US 2001/0008096 A1 Jul. 19, 2001

Related U.S. Application Data

(62) Division of application No. 09/081,376, filed on May 19, 1998, now Pat. No. 6,240,820.

(51) Int. Cl.[7] .................................................. B26D 5/00
(52) U.S. Cl. ............................ 83/54; 83/188; 83/178; 83/451
(58) Field of Search .......................... 83/188, 451, 178, 83/54, 180, 467.1, 466.1, 184, 13

(56) References Cited

U.S. PATENT DOCUMENTS

| | | |
|---|---|---|
| 410,723 A | 9/1889 | Wiesing |
| 414,287 A | 11/1889 | Carnahan |
| 718,930 A | 1/1903 | Harrison |
| 1,357,356 A | 11/1920 | Smith |
| 1,424,359 A | 8/1922 | Isgrig |
| 1,513,100 A | 10/1924 | Frederick |
| 2,776,003 A | 1/1957 | Koster |
| 3,065,657 A | 11/1962 | Thompson |
| 3,074,302 A | 1/1963 | Coulon et al. |
| 3,120,143 A | 2/1964 | Kreider |
| 3,368,255 A | 2/1968 | Cotton |
| 3,567,088 A | 3/1971 | Andersen |
| 3,698,274 A | 10/1972 | Coulon et al. |
| 3,866,501 A | 2/1975 | Glendenning et al. |
| 3,955,453 A | 5/1976 | Carmichael et al. |
| 4,205,569 A | 6/1980 | Horn et al. |
| 4,411,183 A | * 10/1983 | Auer ........................ 83/581 |

(List continued on next page.)

FOREIGN PATENT DOCUMENTS

JP  5310092  11/1993

*Primary Examiner*—Kenneth E. Peterson
*Assistant Examiner*—Omar Flores-Sánchez
(74) *Attorney, Agent, or Firm*—Price, Heneveld, Cooper, DeWitt & Litton

(57) ABSTRACT

A die apparatus includes a first die configured to telescopingly engage an end section of a tubular bar, including one or more "floating" mandrels configured to extend into cavities of the tubular bar, and further including a stationary die member spaced from the mandrel(s). The mandrel(s) and the stationary die member include angled cutting edges that are aligned so that the cutting edges are engageable from a single transverse direction. The mandrel(s) is movably supported on the first die to float parallel the single direction toward and away from the stationary die member. A cutting die has a shearing punch configured to move along the single direction to sequentially engage the angled cutting edges to shear off an angled portion of the end section. The die apparatus is optimally designed for use with a rollformed swept tubular bumper bar having a B-shape and that has walls forming first and second tubular sections that define first and second cavities, with the walls further defining a third cavity between the first and second cavities. In such a die apparatus, the first die includes first, second, and third mandrels configured to extend into the first, second, and third cavities, respectively, of the B-bumper. A method related to the above apparatus is also disclosed.

32 Claims, 4 Drawing Sheets

U.S. PATENT DOCUMENTS

| | | |
|---|---|---|
| 4,422,680 A | 12/1983 | Goupy |
| 4,510,830 A | 4/1985 | Post |
| 4,744,276 A | 5/1988 | Duce |
| 4,794,834 A | 1/1989 | Werner |
| 4,930,384 A | 6/1990 | Nakatsuji |
| 4,974,436 A | 12/1990 | Nakatsuji |
| 5,080,410 A | 1/1992 | Stewart et al. |
| 5,080,427 A | 1/1992 | Sturrus et al. |
| 5,092,512 A | 3/1992 | Sturrus et al. |
| 5,104,026 A | 4/1992 | Sturrus et al. |
| 5,305,625 A | 4/1994 | Heinz |
| 5,306,058 A | 4/1994 | Sturrus et al. |
| 5,340,178 A | 8/1994 | Stewart et al. |
| 5,358,294 A | 10/1994 | Palmer |
| 5,395,036 A | 3/1995 | Sturrus |
| 5,407,239 A | 4/1995 | Arai et al. |
| 5,454,504 A | 10/1995 | Sturrus |
| 5,462,325 A | 10/1995 | Masuda et al. |
| 5,577,796 A | 11/1996 | Clausen |
| 5,603,541 A | 2/1997 | Wada et al. |
| 5,967,010 A * | 10/1999 | Van Manen .................. 83/54 |
| 6,209,431 B1 * | 4/2001 | Wickham .................... 83/165 |
| 6,305,201 B1 * | 10/2001 | Ghiran et al. ................. 72/55 |

\* cited by examiner

DIE APPARATUS FOR CUTTING END OF BUMPER BAR

This application is a divisional of U.S. application Ser. No. 09/081,376, filed on May 19, 1998, entitled DIE APPARATUS FOR CUTTING END OF BUMPER BAR, now U.S. Pat. No. 6,240,820.

BACKGROUND OF THE INVENTION

The present apparatus relates to a die apparatus for cutting angles onto end sections of a vehicle bumper bar made from high strength steel, where the bumper bar has tubular sections extending longitudinally along its length.

Recently, novel rollforming apparatuses and methods were patented for forming high strength swept tubular vehicle bumpers. For example, see U.S. Pat. Nos. 5,092,512; 5,104,026; 5,395,036; and 5,454,504. Bumpers made by these apparatuses and methods typically have the advantage of a lower weight and greater strength-to-weight ratio than conventionally stamped bumper bars, and further their manufacturing cost is typically lower or at least very competitive with processes for stamping conventional bumpers for high volume runs. These bumper bars have a continuous curvilinear sweep well-suited for vehicles having an aerodynamic appearance, such as vehicles having rounded front corners.

However, vehicle manufacturers have recently designed bumper bars with a compound angle along a front face of the bumper bar at its ends. The compound angle provides an increased sweep at the vehicle fenders, giving a visual effect that is even more aerodynamic in appearance. The rollforming apparatuses and methods disclosed in the above-noted patents are adapted to manufacture a continuous tubular bumper section, which continuous tubular bumper section may have pre-pierced or pre-punched holes, but the rollforming apparatuses and methods are not adapted to make a tubular bumper section having a compound angle on ends of the bumper sections. This presents a problem since the ultra-high strength material used to make the rollformed swept tubular bumpers is not easily deformed or cut once the tubular bumper section is formed, in part because it is difficult to support an inside of a tube section after the bumper is formed. As a result, secondary operations intended to form a compound angle on ends of the tubular bumper sections typically are expensive, have slow cycle times, are maintenance problems, and/or are difficult quality control problems. In addition, it is noted that the corners of a vehicle must pass stringent federal regulations, including corner impact strengths for bumpers, as well as pass stringent quality control standards, such that the reliability of any process used to make the compound angle must be very good and repeatable. Also, the front corners of vehicles are highly visible and subject to consumer scrutiny, such that any process used to make the compound angle must be capable of being dimensionally accurate and must be capable of being held to tight tolerances. At the same time, the automotive industry is very competitive, such that the cost of secondary operations to put a compound angle into a bumper section must be minimized.

One secondary operation presently used to form a compound angle at an end of a tubular bumper beam includes using carbide-tipped coldsaws to cut away a pie-shaped section, and then welding a plate onto the cut-away area to form the compound angle. A problem is that the coldsaw blades quickly wear out, or bind and break, or wander (particularly as they enter the bumper section at an angle) such that they do not provide an accurate or quick cut. Each of these problems cause downtime and/or expense. Further, the process of cutting a bumper with a coldsaw takes up an unacceptably long time, and can result in unacceptable burrs. Consequently, the process of cutting a tubular bumper made of high strength steel material with a coldsaw results in slow cycle times, broken and worn-out blades requiring constant maintenance, and higher than desired cost.

Another secondary operation presently used to form a compound angle is to slit or cut top and bottom walls of the tubular bumper section, compress the front face of the tubular bumper section toward its rear face to form the compound angle, and then weld the top and bottom walls together to permanently secure the front and rear faces in the position forming the compound angle. However, this method sometimes does not accurately form the compound angle. Further, it is difficult to slit or cut intermediate walls that are located between outer top and bottom walls, such as when there are multiple tubes formed in the tubular bumper section. For example, a "B" shaped bumper is an example of a bumper section having multiple tubes formed therein, including intermediate walls. (See U.S. Pat. No. 5,395,036.) A coldsaw can be used, but then there are the problems noted above with high maintenance, slow cycle times, and quality problems.

Still another secondary operation presently used is to weld an end bracket onto the ends of a "short" tubular bumper section, with the end bracket completely forming an end of the bumper section, including top, bottom, and side walls. However, this design requires careful quality control of the welding process to assure that the welds are sufficient to meet federal regulations on corner bumper impact tests, keeping in mind that in this bumper design, the welds must take substantial loads on impact. It is noted that the ultra-high strength materials of the present bumper sections can be difficult to reliably weld on, due partially to the strength of the material, and the thinness of the sheet stock used. Further, the dimensions of the end bracket and its assembly onto the bumper section can be difficult to control dimensionally.

Another secondary operation uses dies to mechanically crush ends of the tubular bumper section, with the front and rear walls on ends of the tubular bumper section being forced together to form the compound angle and with the top and bottom walls being crushed to allow the front and rear walls to come together. (For example, see U.S. Pat. No. 5,306,058, although it is noted that the bumper in U.S. Pat. No. 5,306,058 has the crushed surface on its back side and not on its front side.) However, it is difficult to control the dimensions of crushed ends, and further, it is difficult to deform the high strength steel material used to make the tubular bumper sections, particularly after the tubular bumper section is formed. This is particularly true for B-shaped tubular bumper sections, where there are intermediate walls that extend perpendicularly to the direction of the crushing forces and that resist the crushing process. Notably, these intermediate walls are difficult to access to pre-notch or to engage to control their deflection during the deformation process.

Up until the present invention, die apparatuses and related methods were generally considered to be poor alternatives to cut a pie-shaped section off of a side and end of a tubular bumper to form a compound angle thereon for several reasons. In order to use shearing dies for cutting off a pie-shaped section, the tube section of the high strength material being cut would have to be supported on the inside and the outside of the tube section for several inches into an end of the tube section. Further, the "inside" support would have to be sufficiently strong to not break during the die cutting process and be strong enough not to have trouble maintaining the position of its cutting edge, yet it would have to be small enough to fit inside the tubular concavity of the tubular bumper. These problems are aggravated by the ultra-high strength material of the bumper, the very thin wall sections of the bumper materials, and the existence of multiple tube sections in some tubular bumper bars, which tube sections do not always have consistent dimensions as they come off the rollforming apparatus that forms the tubular bumper. Further, it is noted that shearing dies for cutting off material have cutting edges that have critical clearance dimensions that must be tightly held.

Accordingly, an improved process solving the aforementioned problems and having the aforementioned advantages is desired.

SUMMARY OF THE PRESENT INVENTION

In one aspect of the present invention, a die apparatus is provided that is adapted to engage and cut an end of a tubular bar made from high strength sheet steel, the tubular bar having walls forming first and second tubular sections that define first and second cavities with the walls further defining a third cavity between the first and second cavities. The die apparatus includes a first die configured to telescopingly engage an end section of the tubular bar, including first, second, and third mandrels configured to extend into the first, second, and third cavities, respectively, and including cutting edges that are aligned so that the cutting edges are engageable from a single direction that extends transversely to the first, second, and third mandrels. A cutting die has a shearing punch configured to move along the single direction to pass operably across the aligned cutting edges to sequentially shear the walls to remove a portion of the end section.

In another aspect, a die apparatus includes a first die configured to telescopingly engage an end section of the tubular bar, including a first mandrel configured to extend into at least one cavity of the tubular bar, and further including a stationary die member spaced from the first mandrel. The first mandrel and the stationary die member include angled cutting edges that are aligned, so that the cutting edges are engageable from a single direction. The first mandrel is movably supported on the first die to float parallel the single direction toward and away from the stationary die member. A cutting die has a shearing punch configured to move along the single direction to sequentially engage the angled cutting edges to shear off an angled portion of the end section.

In yet another aspect of the present invention, a method for manufacturing vehicle bumpers made of high strength steel includes providing a tubular bar having walls forming at least one tubular section defining at least one cavity, and providing a die apparatus including a first die configured to telescopingly engage an end section of the tubular bar, the first die including a first mandrel configured to extend into the cavity in the tubular bar, and further including a stationary die member spaced from the first mandrel. The first mandrel and the stationary die member include angled cutting edges that are aligned so that the cutting edges are engageable from a single direction, and the first mandrel is movably supported on the first die to float parallel the single direction toward and away from the stationary die member. The die apparatus further includes a cutting die having a shearing punch configured to move along the single direction to sequentially engage the angled cutting edges to shear off an angled portion of the end section. The method includes extending the end section of the tubular bar into engagement with the die apparatus, and operating the die apparatus by moving the shearing punch to shear off the angled portion of the end section.

These and other features, advantages, and objects of the present invention will be further understood and appreciated by those skilled in the art by reference to the following specification, claims, and appended drawings.

DETAILED DESCRIPTION OF PREFERRED EMBODIMENT

Figure 4:
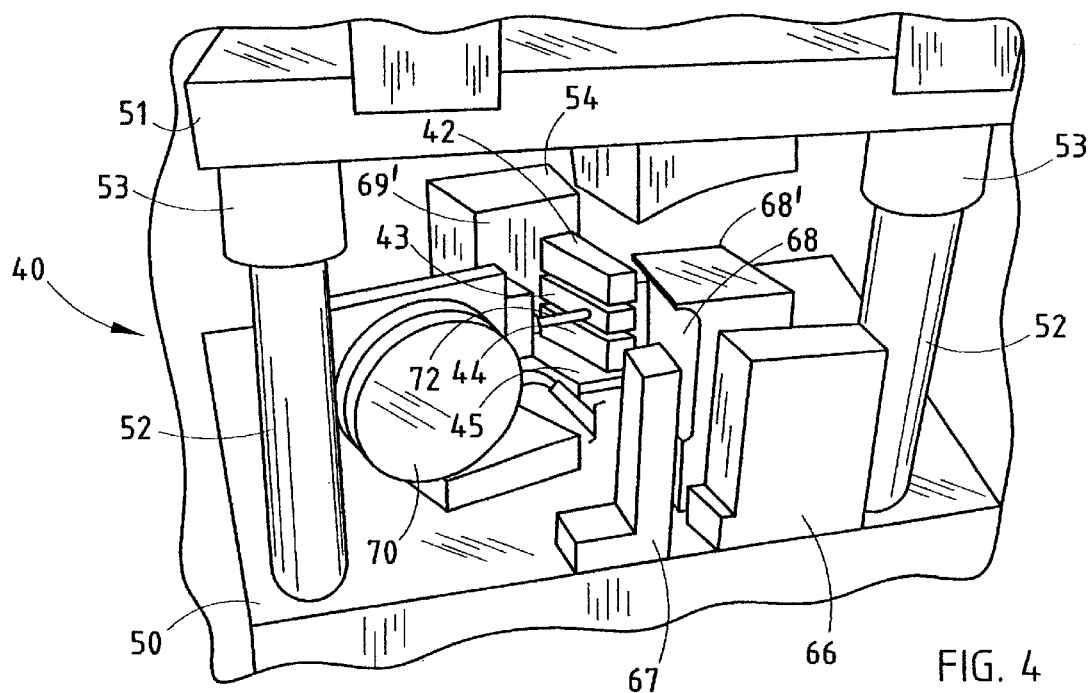
FIG. 4 is a perspective view of a die apparatus embodying the present invention, the die apparatus being configured to cut the pie-shaped section of scrap from the end section of the tubular bar shown in FIG. 2.

For purposes of description herein, the terms "upper", "lower", "right", "left", "rear", "front", "vertical", "horizontal", and derivatives thereof shall relate to the invention as oriented in FIG. 4 with the "front" being in a direction out of the page. However, it is to be understood that the invention may assume various alternative orientations, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as unnecessarily limiting.

Figure 1:
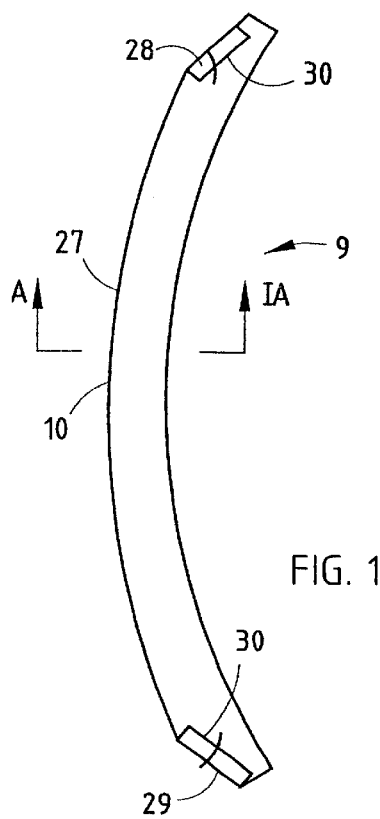
FIG. 1 is a top view of a tubular bumper.
Figure 2:
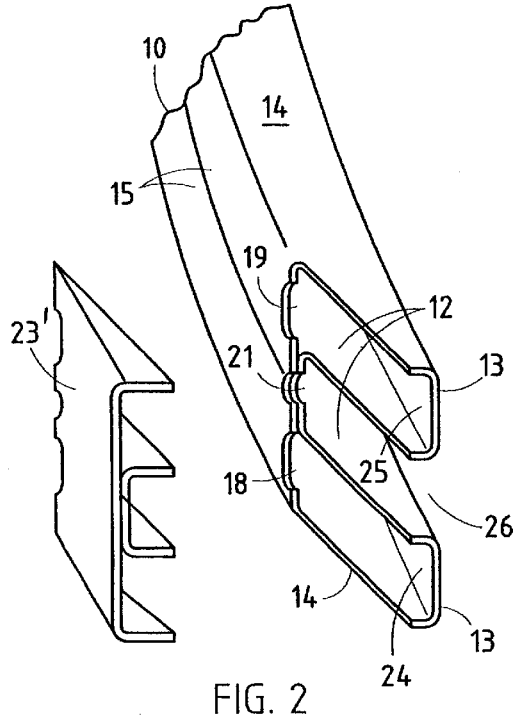
FIG. 2 is a perspective view of an end section of the tubular bar shown in FIG. 1, with a pie-shaped section of scrap shown sheared away from the end section.
Figure 3:
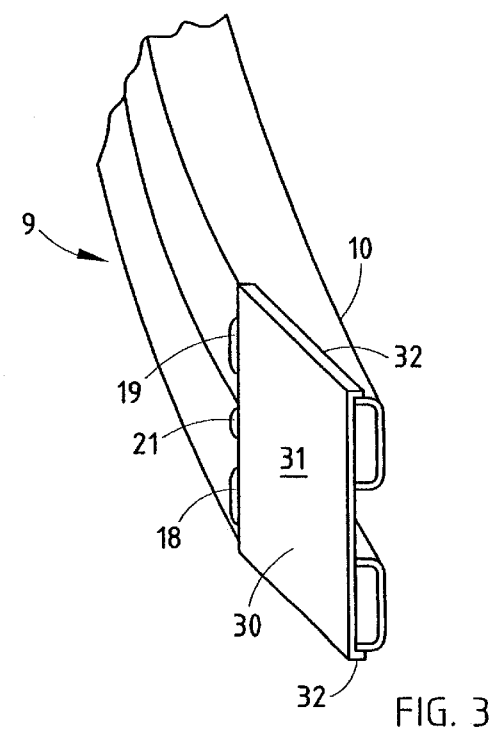
FIG. 3 is a perspective view of the end section of the tubular bumper shown in FIG. 1, including an end plate welded to the end section.
Figure 7:
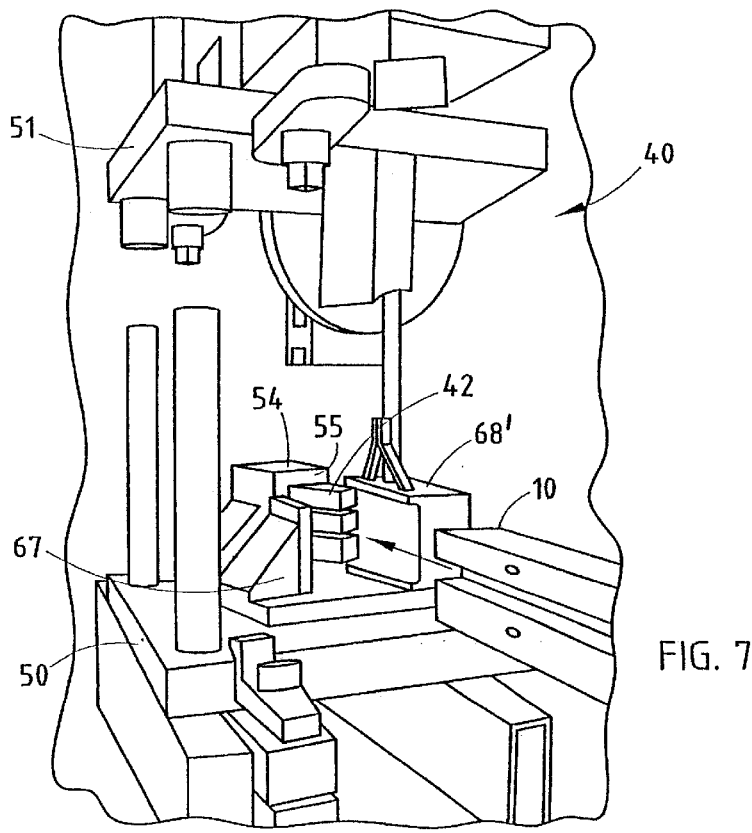
FIG. 7 is a perspective view similar to FIG. 6, but showing the tubular bar pulled partially away from the die apparatus of FIG. 4 but in-line and ready to be engaged therewith.
Figures 8, 9:
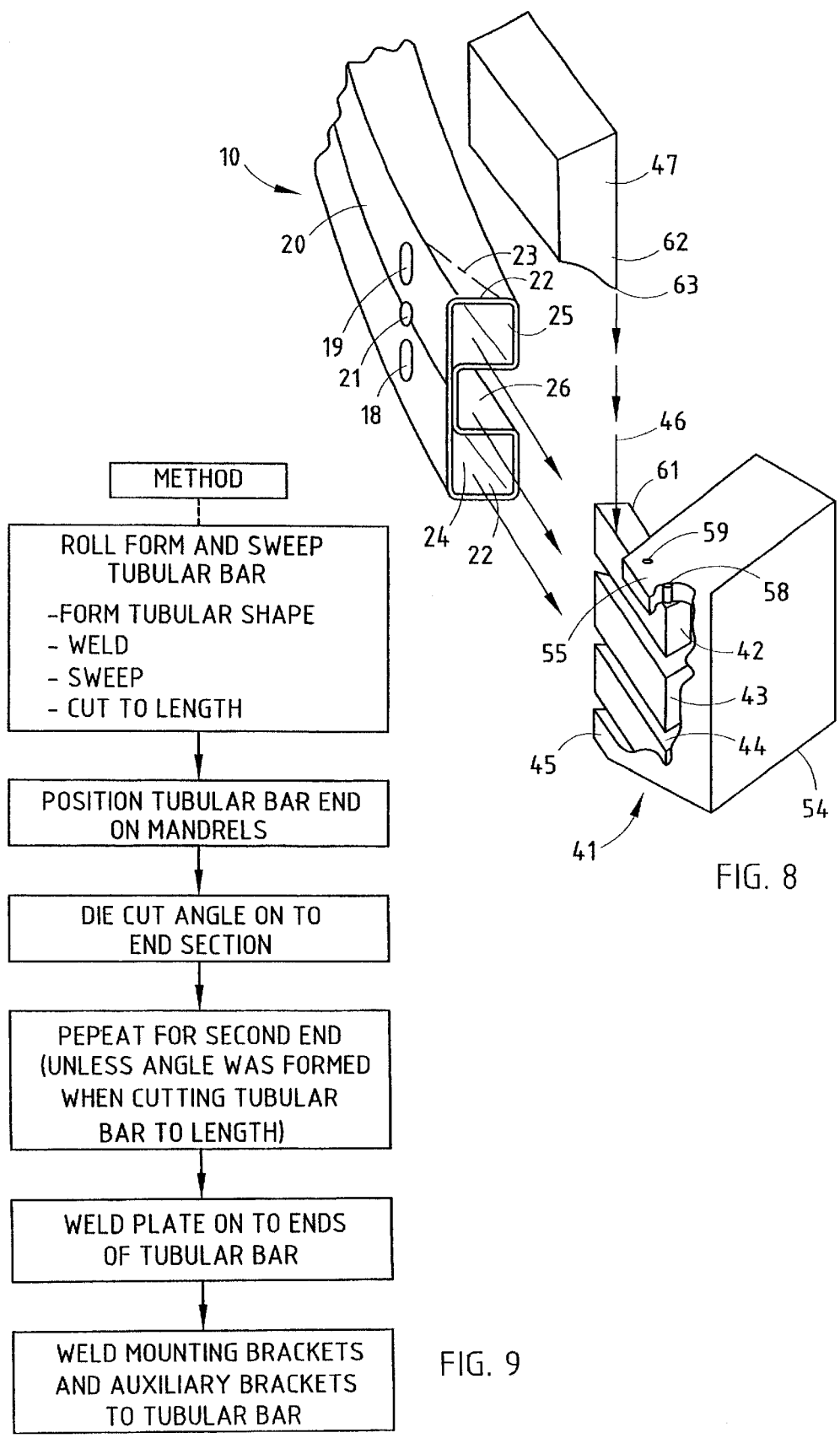
FIG. 8 is an exploded perspective view showing the tubular bar ready to be engaged with the mandrels of the present die apparatus.
FIG. 9 is a flow chart showing a method of manufacturing a bumper bar using the present die apparatus.

A die apparatus 40 (FIG. 7) includes a lower first die 41 configured to telescopingly engage an end section of a tubular bar 10, such as is used for manufacturing a B-shaped vehicle bumper bar 9 (FIGS. 1, 3, and 9). The first die 41 (FIG. 8) includes vertically movable "floating" mandrels 42–44 configured to extend into the at least one cavity of the tubular bar 10, and further includes a stationary bottom die member 45 spaced below the bottom mandrel 44. The mandrels 42–44 and the stationary die member 45 include upwardly facing angled cutting edges that are aligned so that the cutting edges are engageable from a single direction 46. The mandrels 42–44 are movably supported on the first die 41 to float parallel the single direction 46 toward and away from the stationary die member 45. A cutting die 47 has a shearing punch configured to move downwardly along the single direction 46 to sequentially engage the angled cutting edges to shear off a pie-shaped angled scrap portion 23' (FIG. 2) of the end section of the tubular bar 10. The illustrated die apparatus 40 is optimally designed for use with the illustrated tubular bar 10 having a B-shape and that has walls forming first and second tubular sections that define first and second cavities, with the walls further defining a third cavity between the first and second cavities. In particular, the mandrels 42–44 float in a manner allowing the mandrels to adjust relative to each other and to the tubular bar 10 as the bumper section is extended onto the first die 41, thus allowing the die apparatus 40 to function without binding even where the tubular bars 10 are not dimensionally perfectly consistent from one bar to the next. However, the scope of the present invention is not believed to be limited to only use with a B-shaped bumper. In particular, it is specifically contemplated that the present invention can be used on a single tube bumper. It is also contemplated that one, two, or three of the mandrels can be made to float, while the others remain fixed.

Figure 1A:
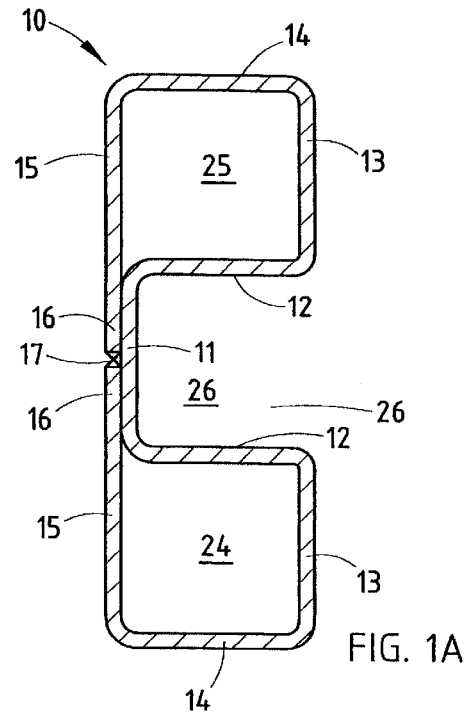
FIG. 1A is a cross-sectional view taken along line IA—IA in FIG. 1.

The illustrated tubular bar 10 comprises a B-shaped component that is used in manufacturing a vehicle bumper bar 9 (see FIGS. 1, 1A, 2, and 3) made of ultra-high strength sheet steel of 120 KSI tensile strength or higher, and a sheet thickness of about 0.072 inches or less. The sheet steel is rollformed into a swept tubular bumper shape with apparatuses and processes as shown in U.S. Pat. Nos. 5,395,036 and 5,454,504, which patents were previously mentioned in the background. The tubular bar 10 (FIG. 1A) includes a center flange 11 and a pair of tube sections formed by intermediate walls 12, rear walls 13, outer walls 14, and front walls 15. The edges 16 of walls 15 are welded to center flange 11, such as at weld 17. Weld 17 can also be spaced away slightly from the abutting ends of edges 16. Holes 18 and 19 (FIG. 8) are pre-pierced in the end sections 20 on walls 15 at a predetermined distance from an end of the bumper, and a hole 21 is pierced between holes 18 and 19 to remove a section of the weld 17. The cross section of the bumper 10 forms two rectangular tubular cavities 24 and 25 and a channel-like cavity 26 between the two cavities 24 and 25.

The tubular bar 10 (FIG. 1) includes a continuously swept center section 27, and end sections 28 and 29 each having a pie-shaped scrap piece 23' (FIG. 2) therefrom cutoff at an angle relative to the front face deformed by walls 15. Specifically, a part of the face of the end sections 28 and 29, including a portion of the walls 13–15, is cut off along line 23 (FIG. 8) from end sections 28 and 29 in order to form a greater angle (i.e., a compound angle) at the ends of the bumper. The compound angle is located at the front corners of the vehicle when the tubular bumper bar 10 is mounted on the vehicle. A U-shaped plate 30 (FIGS. 1 and 3) is welded onto the ends 28 and 29 along the face, and includes a front plate 31 that forms the compound angle on the face of the tubular bar 10, and side attachment flanges 32 that are welded to the outer walls 14.

Figure 5:
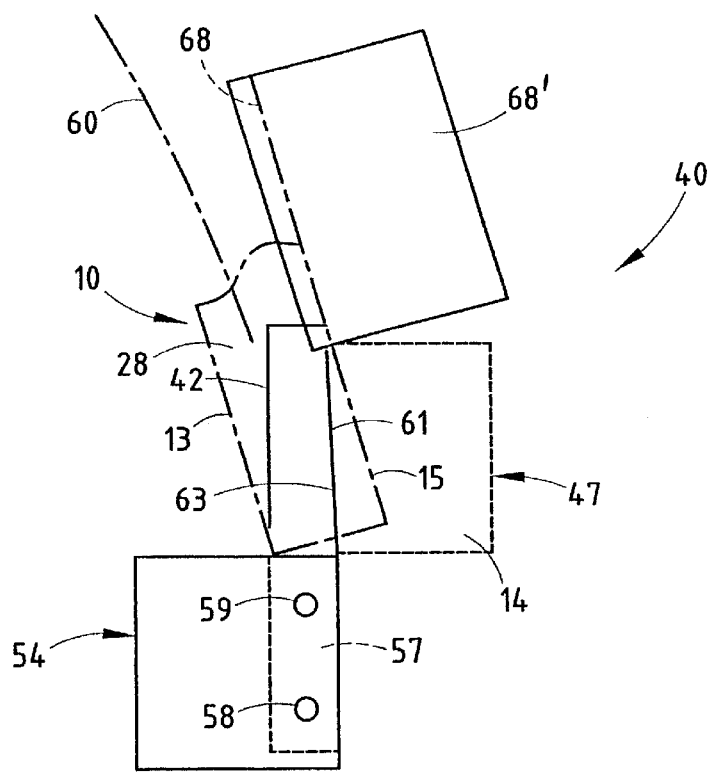
FIG. 5 is a fragmentary top view of FIG. 4.

The die apparatus 40 (FIG. 4) includes a stationary base platen 50 and movable top platen 51, and further includes guide posts 52 and bushing 53 to guide closure of the movable die 47 onto the lower fixed die 41 as the movable platen 51 is brought toward stationary platen 50. First die 41 includes a mounting block 54 attached to base platen 50. The mounting block 54 includes a recess with top and bottom flanges 55, and the mandrels 42–44 each include rear ends 57 that extend into the recess and that are secured to mounting block 54 by pins 58 and 59 (FIG. 8). Pins 58 and 59 (FIGS. 5 and 8) extend vertically through the top and bottom flanges 55 and 56, and through the secured ends 57. The mandrels 42–44 are each shaped to substantially fill a vertical dimension of the respective cavities 24–26 that they engage, so that the tubular bar 10 is not vertically crushed during the die-cutting operation, as discussed below. However, the mandrels 42–44 have a horizontal dimension somewhat less than the horizontal dimension of the cavities 24–26 so that the mandrels 42–44 can be easily extended into the cavities 24–26 without binding. This also allows the mandrels 42–44 to be extended into the cavities 24–26 at an acute angle, as shown in FIG. 5. The mandrels 42–44 are spaced apart by wave washers or the like on pins 58 and 59, so that the walls 12 and 14 of tubular bar 10 fit between the mandrels 42–44 and so that the mandrels 42–44 can be moved to compress or decompress the washers. In particular, the mandrels 42–44 are configured to be extended into the cavities 24–26 at a slight angle to the arcuate longitudinal axis 60 of the tubular bar 10 (FIG. 5), thus maximizing the efficiency and speed of the die cutting operation by providing maximum clearance for the insertion. The cutting edges 61 of the mandrels 42–44 align vertically and face forwardly as shown in FIG. 8, so that the cutting die 47 sequentially engages them during downward movement of the cutting die 47. The surfaces below the cutting edges 61 are recessed to allow the cutting die 47 to easily pass by. Stationary bottom die member 45 provides a cutting edge that also aligns vertically with the other cutting edges 61.

Cutting die 47 (FIG. 4) includes a punch or protruding die part having a cutting edge 63 (FIG. 8) shaped to matingly, shearingly engage the cutting edges 61 on mandrels 42–44 and bottom die member 45. The cutting edge 63 is configured to initially begin its shearing action against the cutting edges 61 at the end of the mandrels 42–44, which location corresponds to the holes 18, 19, and 21 on the tubular beam 10 (see FIG. 8). Alternatively, the shearing action may begin anywhere along the cutting edges 61, as determined by engineering considerations. As the punch 62 is extended (i.e., as the movable platen 51 is lowered), the punch 62 sequentially engages the mandrels 42–44 and then engages the stationary bottom die member 45 to shear the walls 12 and 14 of the tubular bumper 10, to remove the pie-shaped scrap piece 23' from the ends 28 (and 29) of the tubular bar 10. It should be kept in mind that the pie-shaped piece 23' is considerably distorted and deformed during the die cutting process, although FIG. 2 does not show this in order to be clearer as to the pie-shaped piece being removed.

Fixturing blocks 66 and 67 (FIG. 4) are attached to stationary base platen 50, and are spaced apart a distance to accurately guide movement of end section 30 of the tubular bar 10 onto the mandrels 42–44. A concave surface 68 on a third fixturing block 68' captures the end section 30 as the tubular bar 10 is guided onto the mandrels 42–44, and an abutment surface 69 on the fixturing block 54 engages an end of the tubular bar 10 to arcuately stop insertion of the tubular bar 10 onto the mandrels 42–44. A pneumatic device 70 includes an extendable rod adapted to engage the tubular bar 10 to help hold the tubular bar 10 in place during the die cutting operation. A stabilizer rod 72 is attached to an end of the center mandrel 43. The stabilizer rod 72 extends through the outwardly facing open side of the channel cavity 26 in the tubular bar 10, when the tubular bar 10 is inserted onto the mandrels 42–44. The pneumatic device 70 can also be adapted to provide power to a kick-away assist member for forcibly ejecting the tubular bar 10 from the lower first die 41 after the pie-shaped scrap 23' is removed from the tubular bar 10.

Figure 6:
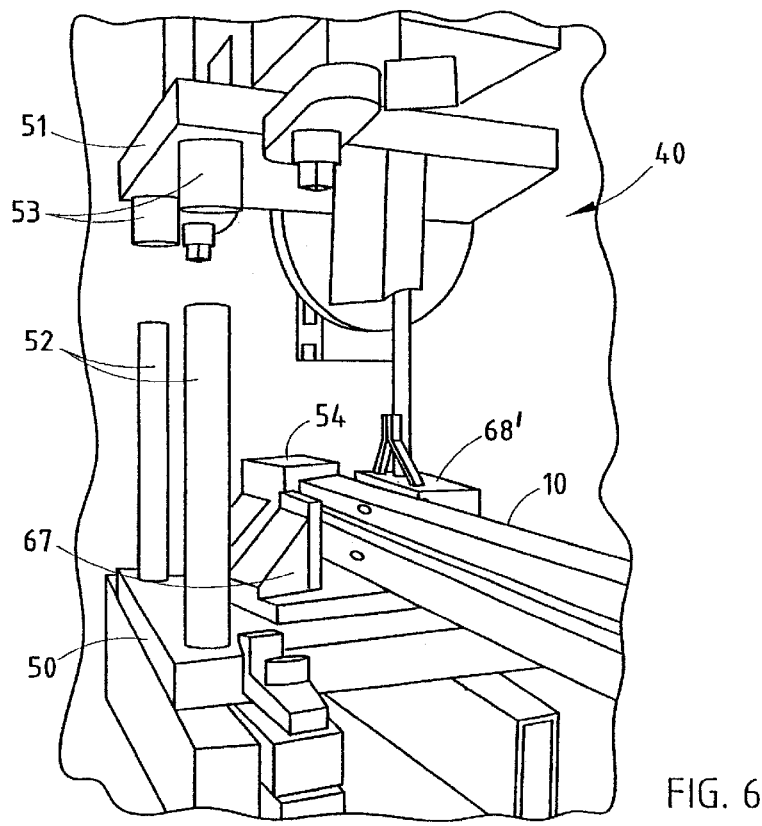
FIG. 6 is a perspective view similar to FIG. 4, but showing the tubular bar of FIGS. 1–3 engaged with the die apparatus of FIG. 4.

Having described the important features and components of the present apparatus, its method of use should now be clear to a person of ordinary skill in this art. As shown in FIG. 9, the tubular bar 9 is formed in a rollforming apparatus that forms its tubular shape, welds it in that shape, sweeps it into a longitudinally curved shape, and then cuts it to length. The rollformed swept tubular bar 10 is then moved into engagement with the lower first die 51, with the mandrels 42–44 of the first die 51 extending into the cavities 24–26 of the tubular bar 10 at an acute angle (see FIG. 7 and then FIG. 6). Advantageously, the mandrels 42–44 float vertically to facilitate inserting the tubular bar 10 fully onto the first die 50, and further the mandrels 42–44 are shaped to have a dimension less that the cavities 24–26 in at least one direction so that insertion of the tubular bar 10 can be relatively easily accomplished. The walls 14 and 15 of the tubular bar 10 engage the fixturing blocks 66 and 67, including the concave guiding surface 68 and abutment surface 69. A clamping rod on the pneumatic device 70 engages the tubular bar 10 to hold the tubular bar 10 in position on the die apparatus 40 as the movable die 47 is brought into operative engagement with the lower first die 41. In particular, as the movable die 47 is lowered, its cutting edge 63 sequentially engages the aligned cutting edges 61 of the mandrels 42–44 and bottom die member 45 to cuttingly shear away the pie-shaped scrap section 23' along line 23. The movable die 47 is then moved vertically away, and the tubular bar 10 is removed with a compound angled front surface formed thereon. The angle cutting process is repeated, unless it is unnecessary, such as when the original cutting step at an end of the rollforming process cuts an end of the tubular bar 10 at an angle. Plates 30 are then welded onto the ends 28 and 29 of the tubular bar 10 to form the bumper bar 9, along with mounting brackets for mounting the bumper bar 9 to a vehicle, and along with any other accessory or attachment brackets.

It is contemplated that the die apparatus 40 could be positioned in-line with an end of the rollforming process, such that at least one end of the tubular bar 10 could be formed in-line with the rollforming process as part of a continuing process. For example, the present die apparatus 40 could be aligned with any of the processes shown in any of U.S. Pat. Nos. 5,092,512; 5,104,026; 5,395,036; and/or U.S. Pat. No. 5,454,504.

In the foregoing description, it will be readily appreciated by those skilled in the art that modifications may be made to the invention without departing from the concepts disclosed herein. Such modifications are to be considered as included in the following claims.

The invention claimed is:

1. A method for manufacturing vehicle bumpers made of high strength steel comprising steps of:

providing a tubular bar having walls forming at least one tubular section defining at least one cavity;

providing a die apparatus including a first die configured to telescopingly engage an end section of the tubular bar, the first die including a first mandrel configured to extend into the at least one cavity, and further including a stationary die member spaced from the first mandrel, the first mandrel and the stationary die member including angled cutting edges that are aligned so that the cutting edges are engageable from a single direction, and the first mandrel being movably supported on the first die to float parallel the single direction toward and away from the stationary die member; the die apparatus further including a cutting die having a shearing punch configured to move along the single direction to sequentially engage the angled cutting edges to shear off an angled portion of the end section;

extending the end section of the tubular bar into engagement with the first die with the first mandrel engaging the at least one cavity; and operating the die apparatus by moving the shearing punch to shear off the angled portion of the end section, including allowing the first mandrel to adjust vertically along the single direction.

2. The method defined in claim 1 wherein the step of extending the end section includes moving the first mandrel along the single direction to accommodate the tubular bar as the tubular bar is extended onto the first mandrel.

3. The method defined in claim 1 wherein the first die further includes second and third mandrels extending parallel and spaced from the first mandrel, and the tubular bar includes walls defining first and second tubes with first and second cavities and a third cavity located therebetween, and wherein the step of extending the end section includes extending the first, second, and third mandrels into the first, second, and third cavities, respectively.

4. The method defined in claim 1 including a step of rollforming the tubular bar from ultra-high strength steel having a tensile strength of at least 120 KSI.

5. The method defined in claim 4 including a step of providing fixturing on the first die for receiving a swept tubular bar, and wherein the step of providing a tubular bar includes providing a swept tubular bar having a longitudinally curved shape.

6. The method defined in claim 1 including a step of welding a plate onto the tubular bar to manufacture a highly stylized vehicle bumper bar having a front surface with a compound angle at its ends.

7. A method for manufacturing vehicle bumpers made of high strength steel comprising steps of:

providing a tubular bar having walls forming first and second tubular sections that define first and second cavities, with the walls further defining a third cavity between the first and second cavities;

providing a first die having first, second, and third mandrels;

providing the first, second, and third mandrels with first, second, and third cutting edges, respectively;

aligning the first, second and third cutting edge for operative engagement from a single direction that extends transversely to the first, second, and third mandrels;

telescopingly engaging an end section of the tubular bar with the first die;

extending the first, second, and third mandrels into the first, second, and third cavities, respectively;

providing a cutting die having a shearing punch;

moving the shearing punch of the cutting die along the single direction to pass operatively across the aligned cutting edges; and sequentially shearing the walls to remove a portion of the end section.

8. The method for manufacturing vehicle bumpers of claim 7, wherein:

the step of providing the first die includes providing fixturing blocks; and further including the step of guiding the tubular bar onto the first die along a longitudinal direction;

wherein the first, second, and third cutting edges of the first, second, and third mandrels each extend at an angle to the longitudinal direction.

9. The method for manufacturing vehicle bumpers of claim 8, further including:

mateably receiving the tubular bar with the fixturing blocks, the tubular bar having predetermined height and width dimensions; and providing the first mandrel with a corresponding height dimension about equal to the said predetermined height dimension, but a corresponding width dimension that is substantially reduced from the said predetermined width dimension.

10. The method for manufacturing vehicle bumpers of claim 9, further including:

orientating the first mandrel in the first die to fit at an angle into the first cavity in the tubular bar.

11. The method for manufacturing vehicle bumpers of claim 8, wherein: the step of providing the tubular bar including making the tubular bar from ultra-high strength sheet steel having a tensile strength of at least 120 KSI and a thickness less than about 0.072 inches.

12. The method for manufacturing vehicle bumpers of claim 8, further including:

movably attaching at least one of the first, second, and third mandrels to the first die for movement generally toward or away from the other mandrels.

13. The method for manufacturing vehicle bumpers of claim 12, further including:

attaching the one of the first, second, and third mandrels to the first die with a pair of attachment pins that extend along a direction defined by movement of the one mandrel.

14. The method for manufacturing vehicle bumpers of claim 12, further including:

movably supporting at least the second and third mandrels by the first die for movement when positioning the tubular bar on the first die and when operating the cutting die.

15. The method for manufacturing vehicle bumpers of claim 8, further including:

orientating the first, second, and third cutting edges; and cutting a pie-shaped section of scrap material off of a side of the end section.

16. The method for manufacturing vehicle bumpers of claim 15, further including:

receiving and securing the tubular bar with the fixturing blocks; and wherein the tubular bar has a continuous cross-sectional shape and has a longitudinal shape that extends along a curvilinear path.

17. The method for manufacturing vehicle bumpers of claim 7, further including:

movably attaching at least one of the first, second, and third mandrels to the first die for movement generally toward or away from the other mandrels.

18. The method for manufacturing vehicle bumpers of claim 17, further including: attaching the one of the first, second, and third mandrels to the first die with a pair of attachment pins that extend along a direction defined by movement of the one mandrel.

19. The method for manufacturing vehicle bumpers of claim 17, further including:

movably supporting at least the second and third mandrels by the first die for movement when positioning the tubular bar on the first die and when operating the cutting die.

20. The method for manufacturing vehicle bumpers of claim 7, wherein:

the step of providing the tubular bar including making the tubular bar from ultra-high strength sheet steel having a tensile strength of at least 120 KSI and a thickness less than about 0.072 inches.

21. The method for manufacturing vehicle bumpers of claim 7, wherein:

the first, second, and third mandrels have opposing sides that are relatively flat for engaging opposing surfaces on flat walls of the tubular sections.

22. A method of cutting an angle into an end of a tubular bar comprising steps of:

providing a tubular bar made from high strength steel, the tubular bar having walls forming at least one tubular section defining at least one cavity;

providing a first die having a first mandrel and a stationary die member spaced from the first mandrel, the first mandrel and the stationary die member including angled cutting edges that are aligned so that the cutting edges are engageable from a single direction;

telescopingly engaging an end section of the tubular bar with the first die;

extending the first mandrel into the at least one cavity;

movably supporting the first mandrel on the first die to float parallel the single direction toward and away from the stationary die member;

providing a cutting die having a shearing punch;

moving the shearing punch of the cutting die along the single direction; and sequentially engaging the angled cutting edges with the shearing punch to shear off an angled portion of the end section.

23. The method of cutting an angle into an end of a tubular bar of claim 22, further including:

movably mounting the mandrel on the first die to float during insertion of the tubular bar onto the first die.

24. The method of cutting an angle into an end of a tubular bar of claim 22, wherein:

the step of providing the tubular bar includes making the tubular bar from ultra-high strength sheet steel having a tensile strength of at least 120 KSI and a thickness less than about 0.072 inches.

25. The method of cutting an angle into an end of a tubular bar of claim 22, wherein:

the mandrel has flat opposing sides for engaging flat walls of the tubular bar.

26. The method of cutting an angle into an end of a tubular bar of claim 22, wherein:

the step of providing the first die includes providing fixturing blocks defining a longitudinal direction; and further including the step of accurately receiving the tubular bar onto the first die along the longitudinal direction;

wherein the cutting edges of the first mandrel extend at an angle to the longitudinal direction defined by the fixturing blocks.

27. The method of cutting an angle into an end of a tubular bar of claim 26, further including:

arranging the cutting edges to cut a pie-shaped section of scrap from the end section of the tubular bar.

28. The method of cutting an angle into an end of a tubular bar of claim 27, wherein: the fixturing blocks are configured to receive a swept tubular bar having a constant cross section and a non-linear length.

29. The method of cutting an angle into an end of a tubular bar of claim 26, further including:

movably mounting the mandrel on the first die to float during insertion of the tubular bar onto the first die.

30. The method of cutting an angle into an end of a tubular bar of claim 26, wherein:

the step of providing the tubular bar includes making the tubular bar from ultra-high strength sheet steel having a tensile strength of at least 120 KSI and a thickness less than about 0.072 inches.

31. The method of cutting an angle into an end of a tubular bar of claim 26, wherein:

the tubular bar has predetermined height and width dimensions;

and further including the step of receiving the tubular bar with the fixturing blocks; wherein the mandrel has a corresponding height dimension about equal to the said predetermined height dimension, the corresponding height dimension extending parallel the single direction so that the tubular bar is not adversely deformed during the step of moving the shearing punch of the cutting die along the single direction, but the mandrel has a corresponding width dimension substantially less than the said predetermined width dimension so that the tubular bar can be readily positioned on the mandrel.

32. The method of cutting an angle into an end of a tubular bar of claim 31, further including:

fitting the mandrel into the cavity at an angle.

* * * * *